United States Patent
Delrot et al.

(10) Patent No.: US 12,472,686 B2
(45) Date of Patent: Nov. 18, 2025

(54) METHOD AND APPARATUS FOR VOLUMETRIC ADDITIVE MANUFACTURING OF CELL-LOADED RESINS

(71) Applicant: ECOLE POLYTECHNIQUE FEDERALE DE LAUSANNE, Lausanne (CH)

(72) Inventors: Paul Delrot, Morges (CH); Damien Loterie, Ecublens (CH); Christophe Moser, Lausanne (CH)

(73) Assignee: ECOLE POLYTECHNIQUE FEDERALE DE LAUSANNE, Lausanne (CH)

( * ) Notice: Subject to any disclaimer, the term of this patent is extended or adjusted under 35 U.S.C. 154(b) by 318 days.

(21) Appl. No.: 17/632,476

(22) PCT Filed: Jul. 7, 2020

(86) PCT No.: PCT/EP2020/069099
§ 371 (c)(1),
(2) Date: Feb. 2, 2022

(87) PCT Pub. No.: WO2021/023452
PCT Pub. Date: Feb. 11, 2021

(65) Prior Publication Data
US 2022/0274326 A1    Sep. 1, 2022

(30) Foreign Application Priority Data
Aug. 6, 2019 (EP) .................................. 19190258

(51) Int. Cl.
B29C 64/165 (2017.01)
B29C 64/291 (2017.01)
(Continued)

(52) U.S. Cl.
CPC .......... B29C 64/165 (2017.08); B29C 64/291 (2017.08); B29C 64/314 (2017.08);
(Continued)

(58) Field of Classification Search
CPC ... B29C 64/165; B29C 64/314; B29C 64/291; B33Y 10/00; B33Y 40/10;
(Continued)

(56) References Cited

U.S. PATENT DOCUMENTS

| 5,344,298 A | 9/1994 | Hull |
| 6,500,378 B1 | 12/2002 | Smith |

(Continued)

FOREIGN PATENT DOCUMENTS

| DE | 102017101823 A1 | 8/2018 |
| FR | 3056593 A1 | 3/2018 |
| WO | 2019043529 A1 | 9/2019 |

OTHER PUBLICATIONS

Baldacchini T., "2 Sional Microfabrication Using tow-Photon-Polymerization", 2015, 2 pages.
(Continued)

Primary Examiner — Christina A Johnson
Assistant Examiner — Xue H Liu
(74) Attorney, Agent, or Firm — Finch & Maloney PLLC

(57) ABSTRACT

The present invention is related to a method and apparatus for the volumetric fabrication of three-dimensional objects or articles from photoresponsive materials loaded with scattering particles, by adjusting the refractive index of said photoresponsive material (12) so as to match the refractive index of said scattering particles (30), and/or using a light source emitting light of a wavelength longer than 630 nm, preferably in a range from 630 nm to 1050 nm, more preferably in a range from 650 nm to 900 nm.

10 Claims, 8 Drawing Sheets

(51) Int. Cl.
  *B29C 64/314* (2017.01)
  *B33Y 10/00* (2015.01)
  *B33Y 40/10* (2020.01)
  *B33Y 70/10* (2020.01)
  *B29K 105/16* (2006.01)

(52) U.S. Cl.
  CPC ............ *B33Y 10/00* (2014.12); *B33Y 40/10* (2020.01); *B33Y 70/10* (2020.01); *B29K 2105/162* (2013.01); *B29K 2995/0031* (2013.01); *B29K 2995/0056* (2013.01)

(58) Field of Classification Search
  CPC ...... B29K 2105/162; B29K 2995/0031; B29K 2995/0056
  USPC ........................................................ 264/308
  See application file for complete search history.

(56) References Cited

U.S. PATENT DOCUMENTS

| | | | |
|---|---|---|---|
| 10,299,940 B2* | 5/2019 | Kloke | A61F 2/5046 |
| 2010/0140550 A1* | 6/2010 | Keller | B33Y 10/00 |
| | | | 252/301.4 R |
| 2017/0361531 A1* | 12/2017 | Hasskerl | B29C 64/165 |
| 2018/0126630 A1 | 5/2018 | Panzer et al. | |
| 2018/0326666 A1 | 11/2018 | Kelly et al. | |
| 2019/0345269 A1* | 11/2019 | Castellano | B01J 35/39 |
| 2020/0031051 A1* | 1/2020 | Wynne | B33Y 50/02 |

OTHER PUBLICATIONS

International Search Report for International Application No. PCT/EP2020/069099 mailed Sep. 23, 2020, 3 pages.
Written Opinion of the International Searching Authority for International Application No. PCT/EP2020/069099 mailed Sep. 23, 2020, 6 pages.
S.M Popoff et al., "Measuring the Transmission Matrix in Optics: An Approach to the Study and Control of Light Propagation in Disordered Media", Physical Review Letters, 104, 100601-1-100601-4, Mar. 12, 2012 See Spc., p. 22.

* cited by examiner

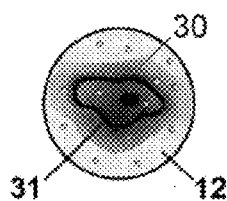
Figure 3
Figure 4
Figure 5
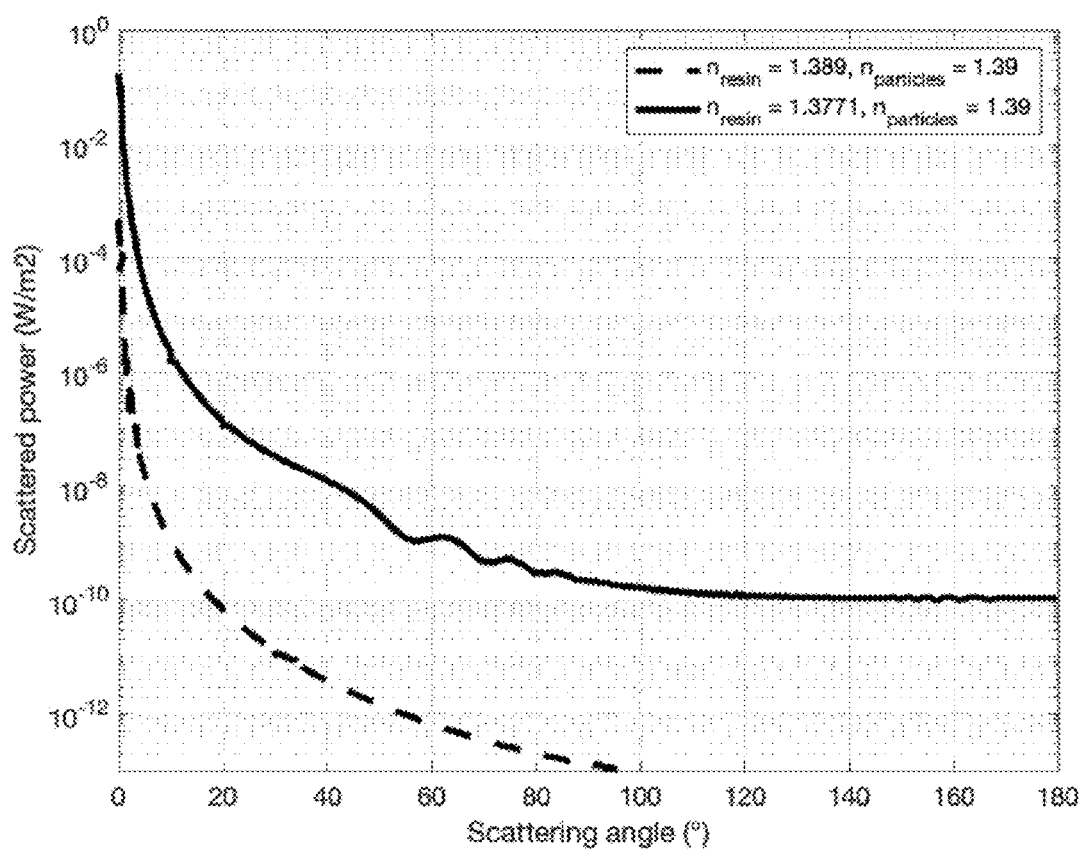

METHOD AND APPARATUS FOR VOLUMETRIC ADDITIVE MANUFACTURING OF CELL-LOADED RESINS

FIELD OF THE INVENTION

The present invention relates to methods and apparatus for the volumetric fabrication of three-dimensional objects or articles from photoresponsive materials loaded with cells, biologic contents or micro and nano-particles. In particular, the present invention is related, but not restricted, to manufacturing systems wherein the objects are generated by tomographic back-projections.

BACKGROUND

In conventional additive manufacturing, a three-dimensional object is fabricated either by pointwise scanning of the object volume or in a layer-by-layer fashion. An example is stereolithography (SLA) (see for example U.S. Pat. No. 5,344,298), where the object is formed one layer at a time by the solidification of a photocurable resist under light irradiation before application of a subsequent layer. The successive layers of the object can be defined for example by scanning a laser beam point-by-point, as suggested in U.S. Pat. No. 5,344,298, or by digital light processing (DLP) technology, as described in U.S. Pat. No. 6,500,378.

In these methods, the layer thickness typically ranges from 10 µm to 200 µm. Thus, the photocuring of a layer at a time with such a thickness can be achieved using highly absorbing or scattering resins. Moreover, using highly absorbing inks is beneficial in SLA and DLP as it prevents the exposure of an already processed layer by the next layer being formed, which could result in manufacturing artefacts, a phenomenon referred as over-curing in additive manufacturing (T. Baldacchini, *Three-Dimensional Microfabrication Using Two-Photon Polymerization*, William Andrew, 2015).

As opposed to layer-wise additive manufacturing techniques such as SLA and DLP, in volumetric additive manufacturing (VAM), the entire volume of the object is solidified at once. An example of VAM (see for example WO 2019/043529) is tomographic volumetric additive manufacturing, in which a three-dimensional object is formed by irradiating a cylindrical volume of resin with a sequence of two-dimensional light patterns while synchronously rotating the volume of resin. In this process, the irradiation of the resin build volume from multiple angles results in an accumulation of light dose that locally overcomes the resin gelation threshold, thus forming the three-dimensional object. This local three-dimensional cumulative light dose deposited in the resin build volume is created by pre-computing the sequence of two-dimensional light patterns using an algorithm, such as a filtered inverse Radon transform. With such volumetric additive manufacturing methods, addressing the entire cylindrical build volume of resin with each the two-dimensional light patterns is essential to accurately create the cumulative three-dimensional light dose distribution that leads to the object formation.

Hence, in VAM the use of resins with high transparency and low scattering properties is favored for the accurate fabrication of three-dimensional objects. The propagation of the two-dimensional light patterns through the entire volume is indeed affected by the resin scattering properties. In scattering or absorbing resins, the resulting light dose distribution in the resin build volume will be blurred or will present unwanted intensity gradients that are detrimental to the object formation.

An example of the detrimental effect of scattering resins on the printing accuracy in VAM is the use of resins seeded with high concentrations of living cells for bioprinting purposes. A straightforward solution would be to reduce the cell concentration, however the differentiation of the printed living cell constructs into functional living units requires high cell concentration ($>10^7$ cells/mL) in the host resin. At such cell concentrations, the scattering of the light patterns limits the achievable width of the prints to about 10 mm in VAM.

Similarly, composite resins may contain micro and/or nano particles, or fibrils, which contribute to light scattering. Thus, depending on the scattering properties of the resin, the VAM produces parts with low fidelity and resolution.

The volumetric fabrication of three-dimensional objects with photoresponsive material containing scattering particles is of paramount importance, for example in bioprinting applications, where the photoresponsive material can be seeded with living cells, or for composite material, such as ceramics, where the photoresponsive material can be loaded with ceramic precursor particles. Indeed, tomographic volumetric additive manufacturing enables the fabrication of objects with more design freedom and with a higher cell viability than other existing manufacturing techniques.

Consequently, there is a need for systems and methods to enable the volumetric additive manufacturing of resins loaded with cells or particles for bioprinting applications or the processing of composite resins. It was therefore the object of the present invention to provide a method and apparatus for generating three-dimensional objects from scattering photoresponsive materials with volumetric additive manufacturing methods with improved accuracy.

SUMMARY OF THE INVENTION

In tomographic volumetric additive manufacturing, the scattering properties of the photoresponsive materials used to produce a three-dimensional article are critical to obtaining a high accuracy and high resolution of the printed article with respect to its digital three-dimensional model. The present invention discloses an apparatus and methods to carry out volumetric additive manufacturing with resins loaded with cells or particles for optimal print accuracy and resolution.

In detail, the present invention is related to a method of fabricating a three-dimensional article comprising the steps of:

providing, in a transparent container of an apparatus for tomographic additive manufacturing, a photoresponsive material, wherein said photoresponsive material contains scattering particles, adjusting the refractive index of said photoresponsive material so as to match the refractive index of said scattering particles;

generating from a light source of said apparatus two-dimensional light-patterns based on computed tomographic projections of said three-dimensional article, and projecting two-dimensional light-patterns into said photoresponsive material and defining a three-dimensional dose distribution, thereby creating a distribution of alterations in said photoresponsive material, and thereby creating said article.

The present invention is furthermore related to a method of fabricating a three-dimensional article comprising the steps of:
  providing, in a transparent container of an apparatus for tomographic additive manufacturing, a photoresponsive material, wherein said photoresponsive material preferably contains scattering particles,
  generating from a light source of said apparatus two-dimensional light-patterns based on computed tomographic projections of said three-dimensional article, and
  projecting two-dimensional light-patterns into said photoresponsive material and defining a three-dimensional dose distribution, thereby creating a distribution of alterations in said photoresponsive material, and thereby creating said article;
characterized in that said two-dimensional light-patterns are projected into said photoresponsive material using a light source emitting light of a wavelength longer than 630 nm, preferably in a range from 630 nm to 1000 nm, more preferably in a range from 650 nm to 900 nm.

The present invention is furthermore related to a system apparatus for the fabrication of a three-dimensional article by computed tomographic projections, preferably by a method according to any of the preceding claims, comprising a light source (10) for projecting dynamic two-dimensional light-patterns (11, 64) into a photoresponsive material (12) that is contained in a transparent vessel (13) of said apparatus, wherein said transparent vessel (13) is provided on a rotation platform (14), characterized in that said light source (10) is capable of emitting light of a wavelength longer than 630 nm, preferably in a range from 630 nm to 1050 nm, more preferably in a range from 650 nm to 900 nm.

The present invention is furthermore related to a method of fabricating a three-dimensional article comprising the steps of:
  providing, in a transparent container (13) of an apparatus for tomographic additive manufacturing, a photoresponsive material (12), wherein said photoresponsive material (12) contains scattering particles (13),
  generating from a light source (10) of said apparatus a first set of two-dimensional light-patterns (11; 64) based on computed tomographic projections of said three-dimensional article, and
  generating a second set of two-dimensional light-patterns (11; 64) obtained from said first set of two-dimensional light-patterns by applying a computed pre distortion to compensate for the distortion effect caused by light propagation in said photoresponsive material (12), and
  projecting said second set of two-dimensional light-patterns (11; 64) into said photoresponsive material (12) and defining a three-dimensional dose distribution, thereby creating a distribution of alterations (15) in said photoresponsive material (12), and thereby creating said article,
characterized in that said second set of two-dimensional light-patterns (11; 64) are projected into said photoresponsive material (12) using a light source emitting light of a wavelength preferably in a range from 400 nm to 1050 nm.

BRIEF DESCRIPTION OF THE DRAWINGS

The invention will be better understood through the detailed description of preferred embodiments and in reference to the drawings, wherein

FIG. 3 is a schematic illustration of the effect on the volumetric printing method of using a scattering photoresponsive material.

FIG. 4 is a schematic illustration of the effect on the printed three-dimensional object of using a scattering photoresponsive material.

FIG. 5 is a graph illustrating the effect of the present invention of matching the refractive index of the photoresponsive material to the index of the scattering particles in suspension in the photoresponsive material.

DETAILED DESCRIPTION

In tomographic volumetric additive manufacturing, a volume of photoresponsive materials is illuminated from many directions with patterns of light. These patterns of light are computed with an algorithm similar to that used in X-ray computed tomography, also known as medical CT scanners. These algorithms are known to the skilled person.

Figure 1A:
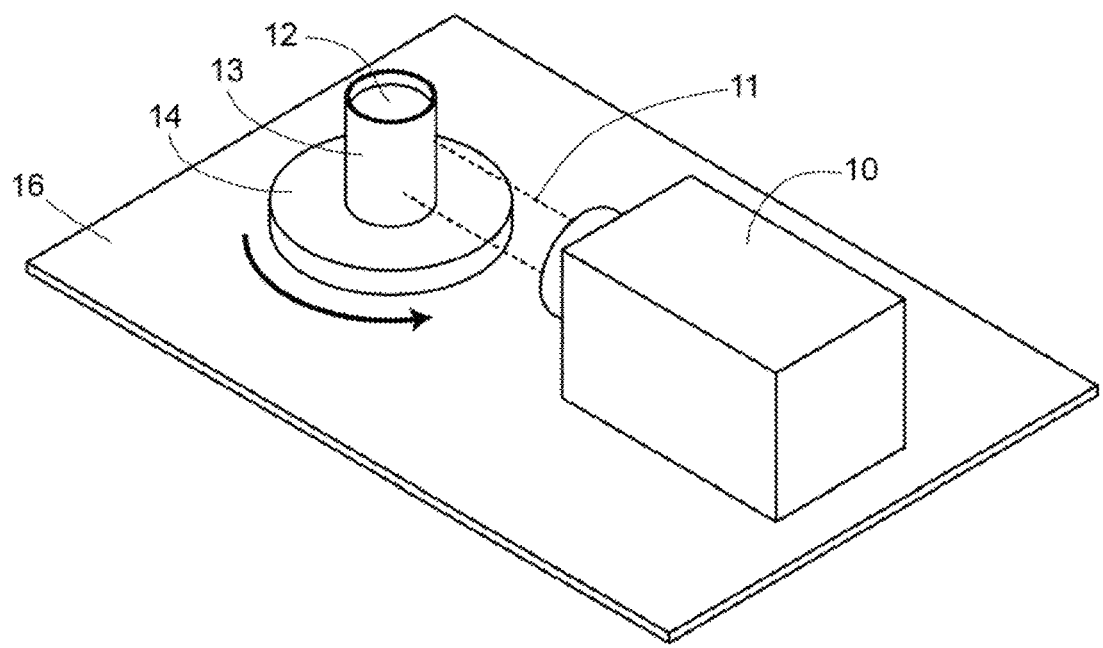
FIG. 1A is a perspective view of one example embodiment of a volumetric additive manufacturing apparatus suitable for the present invention.

An example of a possible embodiment of tomographic additive manufacturing is illustrated in FIG. 1A. An apparatus for tomographic additive manufacturing is described in detail in e.g. WO 2019/043529 A1.

A light source 10 is projecting dynamic two-dimensional light-patterns 11 into a photoresponsive material 12 that is contained in a transparent vessel 13. The light source may be, for example, a laser, a plurality of laser, a LED or a LED array. The transparent vessel 13 is fully or essentially transparent for the light coming from the light source 12.

Figure 1B:
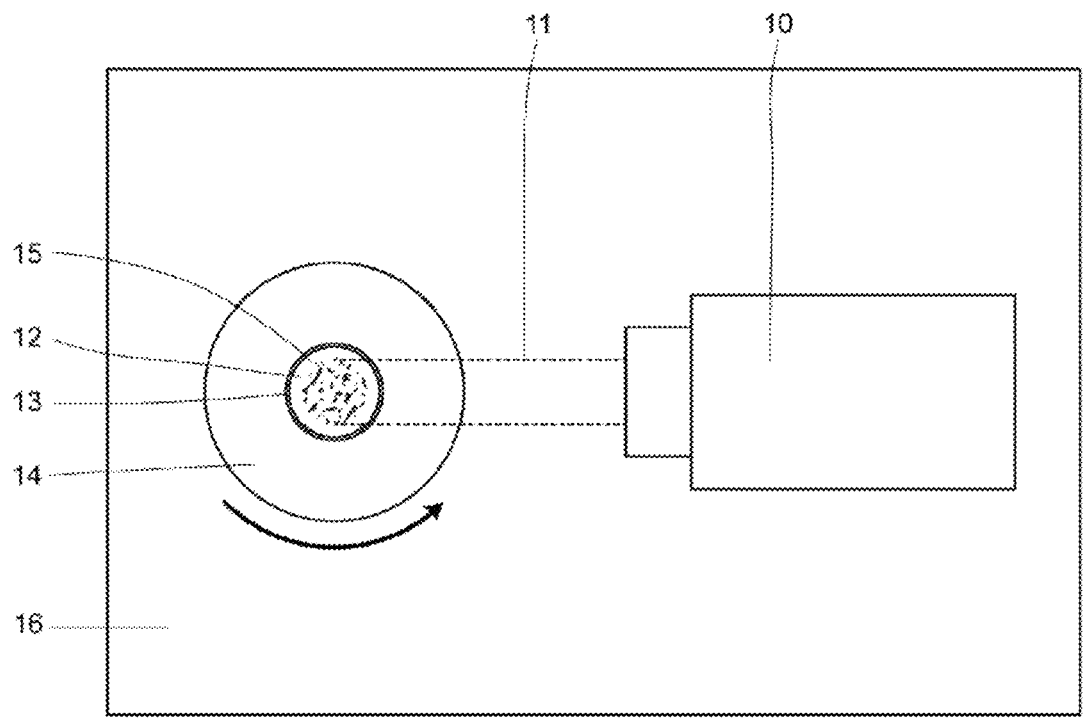
FIG. 1B is a top view of the apparatus of FIG. 1A.

The transparent vessel 13 and photoresponsive material 12 are set onto a rotation platform 14 that is concurrently rotating while the dynamic two-dimensional light-patterns 11 are displayed. The cumulative effect of illuminating the photoresponsive material with each of the light patterns from each corresponding direction is to deposit a controlled three-dimensional distribution of light dose into the photoresponsive medium. As illustrated in FIG. 1B, this distribution of light dose leads to a distribution of alterations 15 in the photoresponsive medium, which creates the three-dimensional object. For example, for a photoresponsive material that solidifies under exposure to light, the three-dimensional distribution of light dose causes the material to solidify in the desired three-dimensional object. In this example of embodiment, all the mentioned components are mounted on a fixed damping platform 16.

The photoresponsive material to be used in tomographic additive manufacturing is known, for example from WO 2019/043529 A1. Generally, the photoresponsive material comprises components that may undergo polymerization when irradiated. Suitable components may be monomers, reactive diluents, oligomers or prepolymers. In addition, a photoinitiator and optionally a photosynergist is present. The photoresponsive material may additionally comprise conventional suitable additives such as fillers, gellifying agents, plasticizers, colorants such as pigments or dyes, extenders, wax, or antioxidants.

Preferably, said photoresponsive material has a dynamic viscosity between 1000 and 50000 centipoises at a temperature of 25° C.

In a further preferred embodiment, said photoresponsive material comprises a concentration of said photo-initiator such that at most 90% of the intensity of said patterns of light is absorbed by the largest thickness of said volume of said photoresponsive material through which said patterns of light are propagating.

In a further preferred embodiment, said photoresponsive material comprises a two-stage photo-initiator, such that said photoresponsive material is locally altered upon local simultaneous or successive illumination with a first and second wavelength of light but not altered if locally illuminated with only one of the wavelengths of light.

In a preferred embodiment of the present invention, the photoresponsive material 12 may form a hydrogel upon irradiation, in which cells may grow. Such hydrogels are known in the art, e.g. from WO 2014/180970 A1.

Figure 2A:
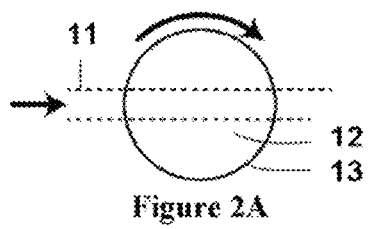
FIGS. 2A-2J are schematic illustrations of fabrication using the volumetric additive manufacturing apparatus of FIG. 1.
Figure 2B:
Figure 2C:
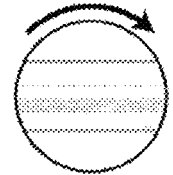
Figure 2D:
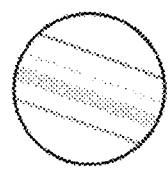
Figure 2E:
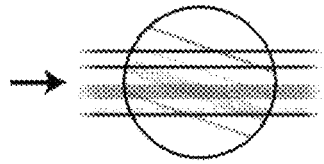
Figure 2F:
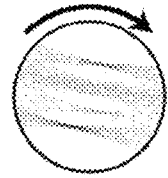
Figure 2G:
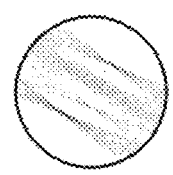
Figure 2H:
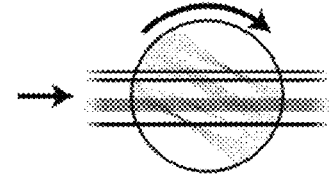
Figure 2I:
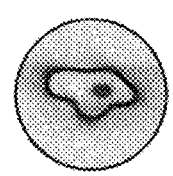
Figure 2J:

The basic principle of tomographic volumetric additive manufacturing is illustrated in FIGS. 2A-2J to better appreciate the impact of scattering resins on this fabrication method. In FIG. 2A, a section of the photoresponsive material 12 and its container (transparent vessel) 13 are shown. The container 13 can be rotated (as indicated by the arrow). A beam of light representing two-dimensional light-patterns 11 is directed inside the container 13. Hence, a certain dose of light is deposited inside the photoresponsive material 12. This dose is represented by a grey shaded area in FIG. 2B. The projection of light is interrupted after a short time, such that the photoresponsive material 12 is not yet converted to its alternate form. For example, if the photoresponsive material 12 is a photopolymer material that polymerizes under illumination by a radiation, the projection is halted at an illumination dose that is well below the polymerization threshold. The sample of photoresponsive material 12 is then rotated as shown in FIG. 2C. The volume that was previously illuminated has now changed orientation with respect to the direction of illumination, as shown in FIG. 2D. The photoresponsive material 12 is then illuminated from a different direction, as shown in FIG. 2E. In doing so, it is possible to expose certain volumes of the photoresponsive material 12 again (represented with a darker shading in FIG. 2E), while other volumes of the photoresponsive material 12 receive only a single, low exposure dose (lighter shading in FIG. 2E). After the second exposure, the process can be repeated by rotating the sample more, as shown in FIG. 2F and FIG. 2G, and illuminating the photoresponsive material 12 from a new orientation, as shown in FIG. 2H. The accumulation of all the projections from all the different orientations determines which parts of the photoresponsive material 12 received enough illumination to be converted to an alternate form, as exemplified by the dark shaded area in FIG. 2I, and which parts are insufficiently exposed to be converted, as exemplified by the lighter shaded areas in FIG. 2I. It is understood that the process explained here may also be done with smaller steps of rotation, or even with a continuous rotating motion. After development of the photoresponsive material 12, a structure can be extracted from the photoresponsive material 12 as illustrated in FIG. 2J. By modulating the light beam representing two-dimensional light-patterns 11 in an appropriate fashion while the photoresponsive material 12 rotates, a controlled distribution of light dose is applied to the photoresponsive material 12.

While FIG. 2A to FIG. 2J illustrate only one section of the photoresponsive material 12 for clarity, it is understood that this process may be carried out concurrently for several layers of the photoresponsive material 12. The distribution of the illumination dose can be controlled independently in each layer, thereby allowing three-dimensional structures to be created.

It is understood from FIG. 2A to FIG. 2J that the light patterns should propagate through the photoresponsive material 12 without modifications or alterations in order to accurately define the dose distribution that eventually leads to the object formation.

As illustrated in FIG. 3, the presence of scattering particles 30 in the photoresponsive material 12 will affect the shape of each light patterns displayed in the photoresponsive material 12 and will eventually smear out the dose deposited 31 in the photoresponsive material 12, thus leading to an inaccurate fabrication of the object after development, as illustrated in FIG. 4.

It has been surprisingly found that the scattering of the light patterns by particles loaded in the photoresponsive material can be dramatically reduced by matching the refractive index of the photoresponsive material with the refractive index of the particles. This is illustrated in FIG. 5 where the power scattered by a 10-µm spherical particle in suspension in the photoresponsive material (resin) is several orders of magnitude lower if the refractive index of the resin is closely matched to that of the particle (see dashed line) than if there is a large mismatch of refractive index (see thick line).

The photoresponsive material and scattering particles used in FIG. 5 for the thick curve were respectively a solution of 10% (v/v) of gelatin methacrylate in phosphate buffered saline and human colon cancer cells (HT29). For the dashed curve of FIG. 5, the same human colon cancer cells were used as scattering particles whereas the photoresponsive material was modelled as a solution index-matched to the scattering particles, in accordance with the present invention.

Figure 6:
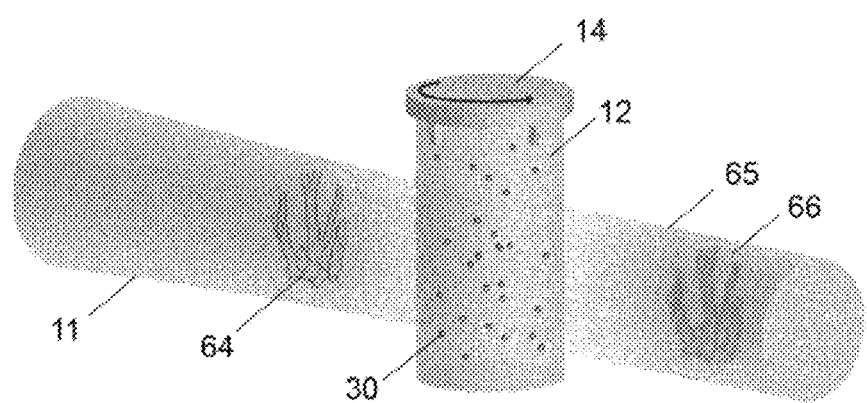
FIG. 6 is a schematic illustration of the scattering of the illumination patterns by the build volume without index-matching of the photoresponsive material and particles.
Figure 7:
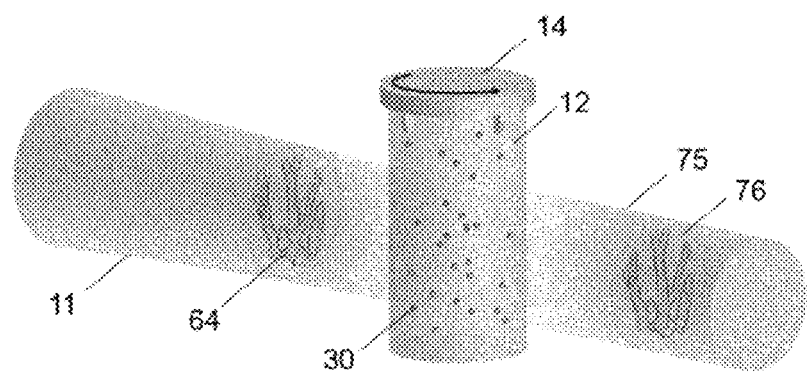
FIG. 7 is a schematic illustration of the scattering of the illumination patterns by the build volume with index-matching of the photoresponsive material and particles according to the present invention.

This method of reducing the scattering of particle-loaded resins for volumetric additive manufacturing is further illustrated in FIGS. 6 and 7. In FIG. 6, an example of tomographic volumetric additive manufacturing with a scattering photoresponsive material in which there is a mismatch between the refractive index of the particles and the photoresponsive material is illustrated. A rotation platform 14 holds the photoresponsive material build volume 12 in which scattering particles 30 are loaded. An input light beam representing two-dimensional light-patterns 11, such as the two-dimensional pattern 64, is projected into the build volume. Owing to the scattering particles 30 contained in the photoresponsive material 12, the propagating light beam 65 is scattered and the two-dimensional light pattern 66 is smeared out, which will negatively impact the volumetric printing accuracy.

In order to obtain well-defined spatial dose distributions with tomographic volumetric additive manufacturing, it is important to match the refractive index of the photoresponsive material with the refractive index of the particles. FIG. 7 shows a preferred of embodiment of the present invention, in which a tomographic volumetric additive manufacturing apparatus is used with a scattering photoresponsive material 12 in which there is a refractive index-matching of the particles 30 and the photoresponsive material 12. A rotation platform 14 holds the photoresponsive material build volume 12 in which scattering particles 30 are loaded. An input light beam representing two-dimensional light-patterns 11, such as the two-dimensional pattern 64 is projected into the build volume. Owing to matching of the refractive index of the photoresponsive material 12 with the refractive index of the loaded scattering particles 30, the propagating light beam 75 is not scattered and the two-dimensional light pattern 76 is accurately displayed through the entire build volume 12 thus ensuring and optimal volumetric printing accuracy.

Methods and devices for determining the refractive index of a material are known and do not have to be discussed here in detail. Reference may be made, for example, to refractometers, spectrometers, interferometers, or microscopes.

According to the present invention, the average refractive index of the scattering particles 30 is the statistical mean of the refractive indices of the individual particles.

Adjustment of the refractive index of the photoresponsive material 12 may be achieved according to the present invention by mixing said photoresponsive material 12 with a medium having a different refractive index that will act as a tunable refractive index medium. By mixing said photoresponsive material 12 with said medium having a different refractive index in varying amounts, a desired refractive index (i.e. a refractive index that matches the refractive index of the loaded scattering particles 30) can be obtained. Mixing can be performed by any known method, e.g. combining the components and stirring them until a homogeneous blend of the components has been obtained.

According to the present invention, any material can be used as medium having a different refractive index that does not adversely affect the creation of the desired three-dimensional article and that (in the case of biological material such as cells) has no toxic effect.

An example of tunable refractive index medium for bioprinting applications in volumetric additive manufacturing include, but are not limited to, iodixanol or glycerin. Examples of tunable refractive index medium for organic photoresponsive materials include, but are not limited to: Ethoxylated (4) Bisphenol A Dimethacrylate (BPA4EODMA), Ethoxylated (10) Bisphenol A Dimethacrylate (BPA10EODMA), Ethoxylated (2) Bisphenol A Dimethacrylate (BPA2EODMA), Ethoxylated (3) Bisphenol A Dimethacrylate (BPA3EODMA), 2-Phenoxyethyl Methacrylate, Tricyclodecanedimethanol Diacrylate, Ethoxylated (10) Bisphenol A Diacrylate (BPA10EODA), Ethoxylated (4) Bisphenol A Diacrylate (BPA4EODA), Ethoxylated (3) Bisphenol A Diacrylate (BPA3EODA), Ethoxylated 4 Phenyl Acrylate (P(4E0)A), 2-Phenoxyethyl Acrylate (2-PEA), and combinations thereof.

According to the present invention, by a "match" of the reactive indices of the photoresponsive material 12 and the scattering particles 30 loaded therein it is meant that the refractive indices of the photoresponsive material 12 and of the scattering particles 30 differ from each other by not more than 2%, preferably 0 to 2%, more preferably 0.01 to 1.5%, even more preferably 0.01 to 1% and especially preferred 0.01 to 0.2%.

The ratio in which the photoresponsive material 12 and the medium having a different refractive index are mixed with each other depends on the degree of match one wants to obtain. Different volume ratios $V_m$, including, but not limited to, 0:100, 20:80, 40:60, 60:40, 80:20 and 100:0 (v/v) may be used.

Figure 8:
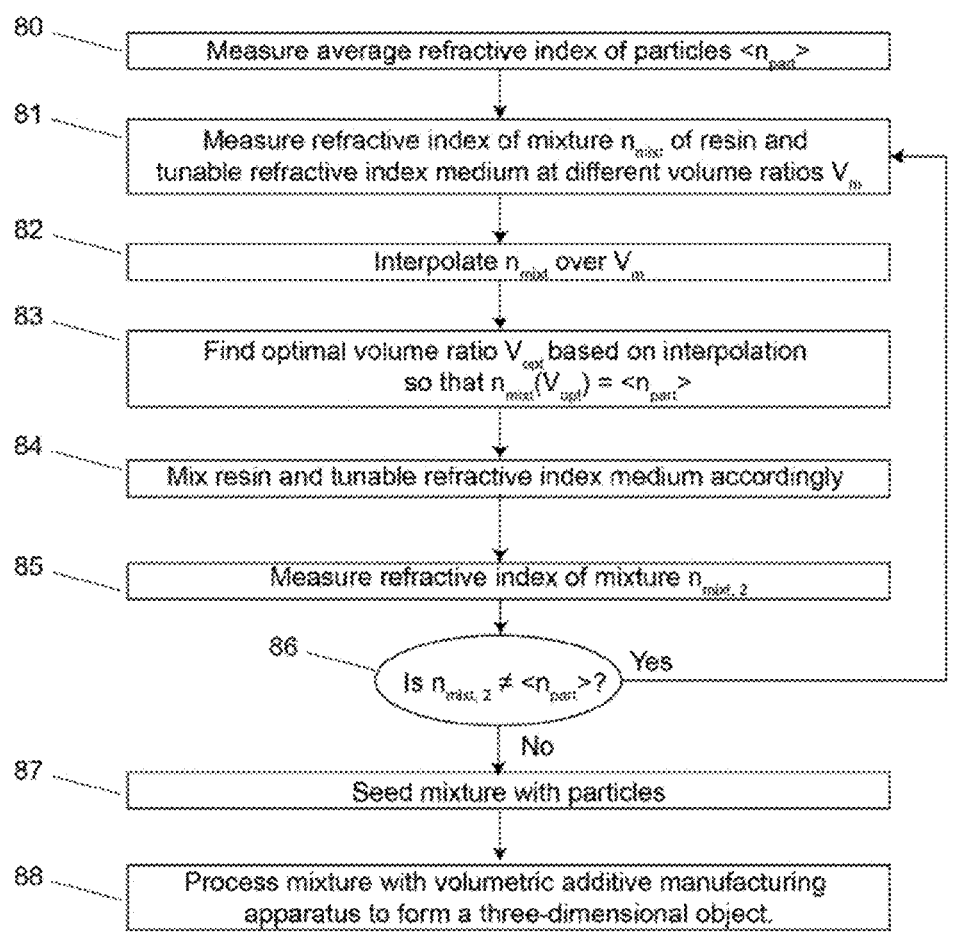
FIG. 8 is a flow chart illustrating an embodiment of the index-matching process of the present invention of the photoresponsive material for accurate volumetric additive manufacturing of particle-seeded resins.

The flowchart in FIG. 8 further describes a method of the present invention to formulate a photoresponsive material 12 whose refractive index matches the refractive index of the loaded scattering particles 30 in order to enable the processing of the scattering photoresponsive material 12 with a tomographic volumetric additive manufacturing method:

The average refractive index $<n_{part}>$ of the scattering particles 30 is first measured, for example with a refractometer or a digital holographic microscope (step 80).

Provided that initially a photoresponsive material 12 having a known certain refractive index was used in the tomographic volumetric additive manufacturing apparatus, this photoresponsive material 12 is mixed with another medium of different refractive index that will act as a tunable refractive index medium.

The photoresponsive material 12 is mixed with the tunable refractive index medium in different volume ratios $V_m$, including, but not limited to, 0:100, 20:80, 40:60, 60:40, 80:20 and 100:0 (v/v), and the refractive index $n_{mixt}$ of each of the mixtures is measured (step 81 in FIG. 8).

The measurements of $n_{mixt}$ for different volume ratios $V_m$ made in Step 81 are interpolated (step 82) so that the optimal volume ratio $V_{opt}$ of the photoresponsive material 12 and the tunable refractive index medium can be derived to yield a mixture of refractive index $n_{mixt}(V_{opt})=<n_{part}>$ (step 83).

The photoresponsive material 12 and the tunable refractive index medium are mixed in said volume ratio $V_{opt}$ (step 84)

The refractive index $n_{mixt,2}$ of the subsequent mixture is measured, for example with a refractometer (step 85)

If the difference between the refractive index of the mixture $n_{mixt,2}$ and the average refractive index of the particles $<n_{part}>$ is more than a certain threshold (i.e. the refractive indices do not match), including, but not limited to 0.1%, 1% or 2% the user should start over the procedure again from step 81.

If the refractive index matching is within the selected threshold (i.e. the refractive indices match), the scattering particles 30 can be loaded in the mixture of original photoresponsive material 12 and tunable refractive index medium (step 87 in FIG. 8).

The resulting mixture is processed with a tomographic volumetric additive manufacturing apparatus to form a three-dimensional object (step 88).

In another preferred embodiment of the present invention, more than one tunable refractive index medium can be added to the original photoresponsive material.

Most photoresponsive materials used in existing additive manufacturing apparatus are sensitive to ultraviolet or blue light i.e. wavelengths in the range 365-450 nm. This is due to the conventionally used photoinitiators that exhibit an absorption maximum in said range of the electromagnetic spectrum.

Figure 9:
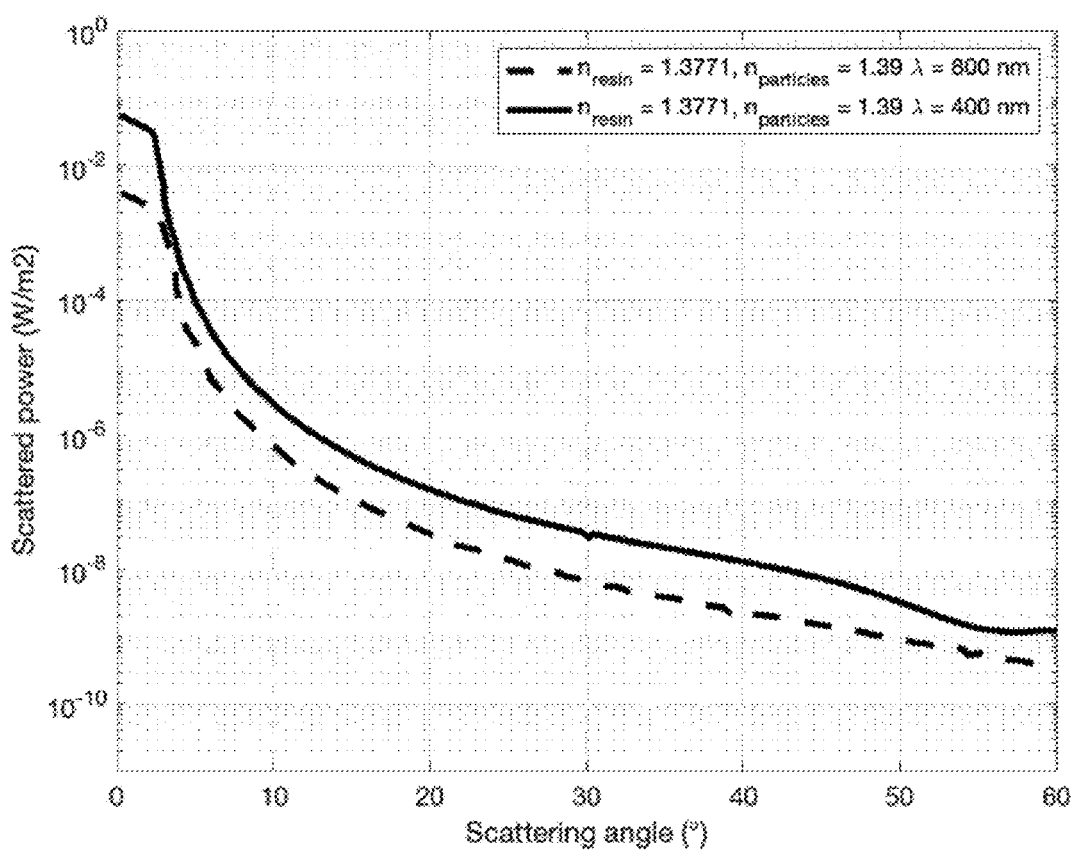
FIG. 9 is a graph illustrating the angular scattered power of a photoresponsive material with scattering particles for different wavelengths.

However, as illustrated in FIG. 9, it has been surprisingly found that it would be beneficial to use a light source in the red part of the visible spectrum. As shown in FIG. 9, for small scattering angles, where scattering is predominant, the scattered power of an incident 1 W/m² light beam is 16 times higher at a wavelength of 400 nm (thick line) than at a wavelength of 800 nm (dashed line), considering the same refractive index mismatch between a photosensitive material and a 10-μm spherical particle in both cases.

Thus, in a preferred embodiment of the present invention, the two-dimensional light patterns 11 in FIG. 1A, are produced using a light source at a wavelength longer than 630 nm, i.e. in the red or infrared region of the electromagnetic spectrum, preferably in a range from 630 nm to 1050 nm, more preferably in a range from 650 nm to 900 nm, in order to dramatically reduce the scattering. Indeed, using illumination wavelengths longer than 630 nm allows for the accurate volumetric fabrication of objects 4 times to 16 times wider than when using the conventional 350 nm to 450 nm range.

Suitable light sources that emit in this range of the electromagnetic spectrum are known. For example, lasers emitting at wavelengths longer than 630 nm are known and commercially available (e.g. http://www.roithner-laser.com/lasersystems/laser systems_671.html).

Owing to the lack of available photo-initiators for photoresponsive materials that have an absorption maximum in this wavelength range, in this embodiment of the present invention, a light source at a wavelength longer than 630 nm, preferably in a range from 630 nm to 1050 nm, more preferably in a range from 650 nm to 900 nm, is combined with a conventional photoinitiator whose absorption band is predominantly in the 365 nm to 450 nm range, but at least to a slight extent expands into the red region of the electromagnetic spectrum (i.e. to wavelengths longer than 630 nm) to process a photoresponsive material 12 loaded with scattering particles 30. Indeed, according to the present invention it could be demonstrated that a sufficiently strong illumination, for example above 50 mW/cm², at a wavelength distinct from the absorption spectrum of a photoinitiator can activate the photo-initiator to alter the phase of the photoresponsive material.

Suitable photoinitiators whose absorption band is predominantly in the 365 nm to 450 nm range, but at least to a slight extent expands into the red region of the electromagnetic spectrum (i.e. to wavelengths longer than 630 nm), are commercially available and known from the literature. An example of a suitable photoinitiator is a ruthenium-sodium persulfate system, such as a combination of ruthenium II trisbipyridyl chloride ([RuII(bpy$_3$)]$^{2+}$) and sodium persulfate (SPS) (e.g. Bjork et al. Biomaterials 2011; 32(10): 2479-2488).

Figure 10:
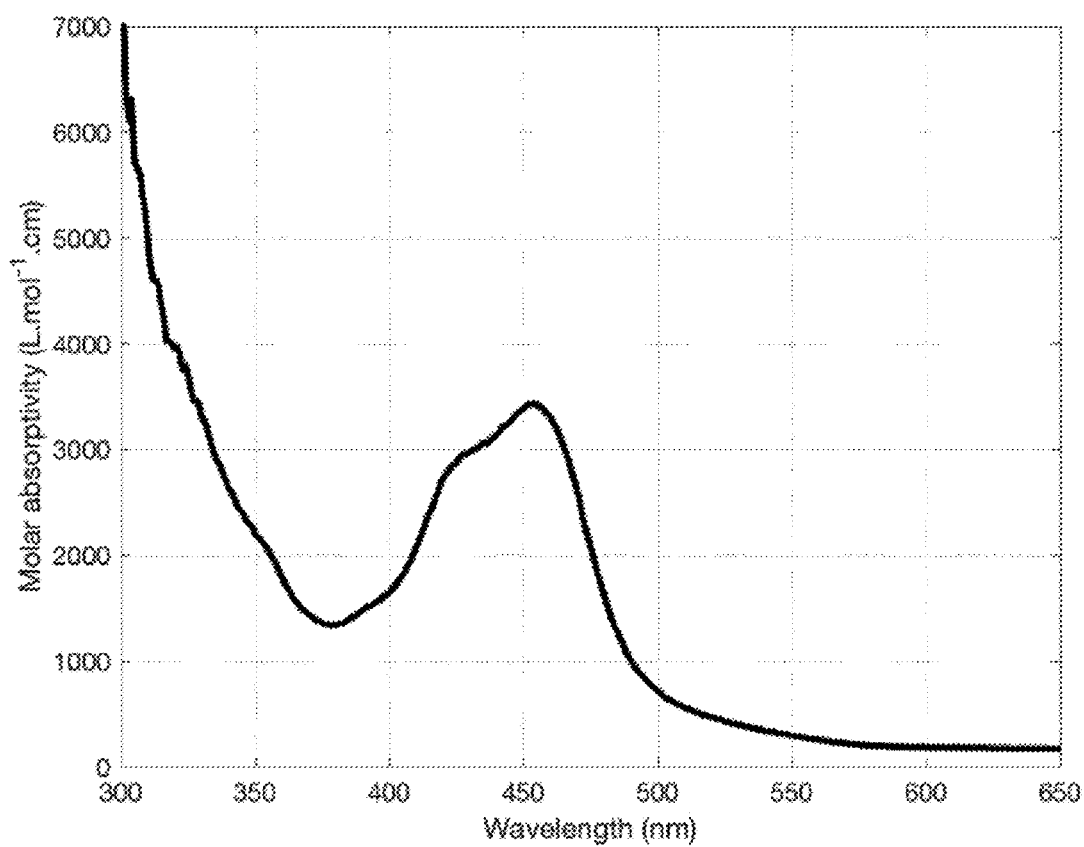
FIG. 10 is the absorption spectrum of a ruthenium-sodium persulfate photoinitiator in phosphate buffered saline.

An example of said preferred embodiment is a volumetric additive manufacturing apparatus, as the one illustrated in FIG. 1, in which the light source is a laser emitting light at a wavelength of 671 nm, a three-dimensional object or article is formed with the volumetric additive manufacturing apparatus out of a photoresponsive material 12 loaded with scattering particles 30 and in which Ruthenium/sodium persulfate is used as a photoinitiator. Interestingly, this photo-initiator is mostly sensitive in the 300 nm to 500 nm region, as illustrated by the absorption spectrum in FIG. 10, yet the authors of the present invention demonstrated that a strong illumination at 671 nm can activate the photo-initiator to form a three-dimensional object or article.

It has been found according to the present invention that the method of fabricating a three-dimensional article is improved even if the two-dimensional light patterns 11 are produced using a light source at a wavelength longer than 630 nm, preferably in a range from 630 nm to 1050 nm, more preferably in a range from 650 nm to 900 nm, without adjusting the refractive index of the photoresponsive material (12) so as to match the refractive index of said scattering particles (30). Thus, while the most beneficial effects of the present invention are obtained by both adjusting the refractive index of the photoresponsive material (12) so as to match the refractive index of said scattering particles (30), and producing the two-dimensional light patterns 11 using a light source at a wavelength longer than 630 nm, preferably in a range from 630 nm to 1050 nm, more preferably in a range from 650 nm to 900 nm, in the same method, the present invention covers also methods employing only one of these steps.

In another preferred variant of this embodiment of the present invention, up-conversion nanoparticles are included in the scattering photoresponsive material in order to allow for its processing with a volumetric additive manufacturing apparatus.

Up-conversion particles (or up-converting) particles are known in the art. They are characterized by the fact that they absorb light of a longer wavelength and emit light of a shorter wavelength.

Examples of up-conversion nanoparticles that can be used in this embodiment include, but are not limited to, a core-shell nanoparticle composed of a core of sodium yttrium fluoride doped with neodymium and a shell composed of sodium yttrium fluoride doped with ytterbium, a core-shell nanoparticle composed of a core of sodium yttrium fluoride doped with neodymium and a shell composed of sodium yttrium fluoride doped with ytterbium, erbium and neodymium.

According to the present invention, it has been surprisingly found that if at least one up-converting material is included into the photoresponsive material to be processed in a method of fabricating a three-dimensional article, the embodiment of the present invention using a light source at a wavelength longer than 630 nm, preferably in a range from 630 nm to 1050 nm, more preferably in a range from 650 nm to 850 nm can be performed even more efficiently. The up-conversion particles absorb the light emitted from the light source, and within the photoresponsive material locally and isotropically emit light of a shorter wavelength, i.e. light in the range of the absorption band of conventional photoinitiators. Thus, even though the light emitted from the light source is not optimal for the employed conventional photoinitiators, within the photoresponsive material itself light of a suitable wavelength is generated, thereby promoting the desired alteration of the photoresponsive material.

According to the present invention, the up-conversion particles should be nanoparticles, so as to minimize any adverse scattering. According to the present invention, a nanoparticle is a particle having an average particle size of 1-1000 nm, preferably 5-500 nm and most preferably 10-100 nm.

According to the present invention, the up-conversion particles should be used in the photoresponsive material in a concentration of 0.1-10 wt.-%, preferably 0.5-5 wt.-%, based on the weight of the entire photoresponsive material that is used in the method.

Figure 11:
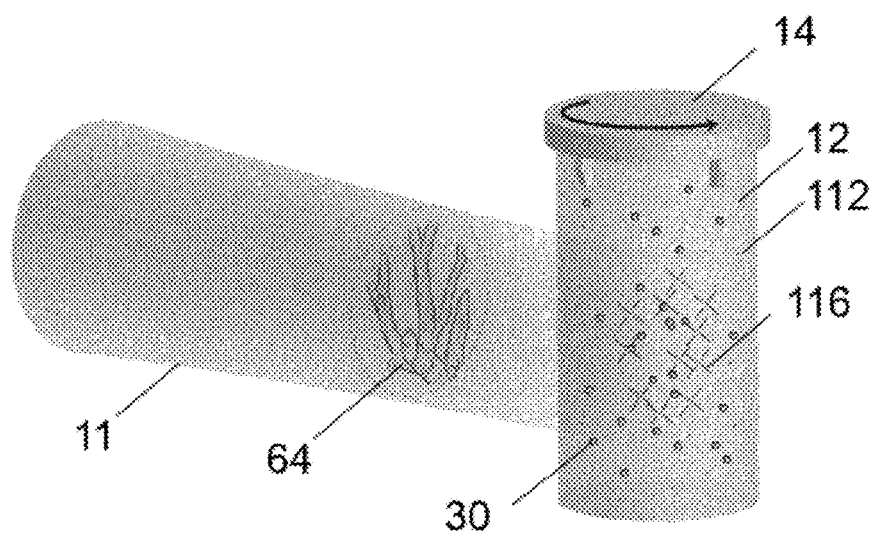
FIG. 11 is a schematic illustration of an embodiment of the present invention of using up-conversion nanoparticles for volumetric additive manufacturing.

An example of this further embodiment of the present invention is illustrated in FIG. 11. A rotation platform 14 holds a build volume of photoresponsive material 12. The photoresponsive material 12 is loaded with up-conversion nanoparticles 112 sensitive to long wavelengths, including, but not limited to, the range of 700 nm to 900 nm. The photoresponsive material 12 may additionally contain scattering particles 30 that prevent the accurate formation of three-dimensional object with a volumetric additive manufacturing apparatus. The photoresponsive material 12 additionally contains a photo-initiator sensitive to a range of wavelengths including, but not limited to, 350 nm to 500 nm. The build volume of photoresponsive material 12 is illuminated with a light source 10 with a wavelength in a range including, but not limited to, 700 nm to 900 nm. Dynamic two-dimensional light patterns 64 are formed out of the light source 10 to deposit a light dose in the photoresponsive material 12. Upon absorption of the light patterns 64 by the up-conversion nanoparticles 116 located in the propagation path of the light patterns 64 in the photoresponsive material 12, a light with a wavelength in a range of, but not limited to, 350 nm to 500 nm, is isotropically locally emitted and triggers the photo-initiator to locally alter the phase of the photoresponsive material 12 and form a three-dimensional object or article.

This embodiment effectively takes advantage of the reduced scattering of light of long wavelengths by particles to accurately form three-dimensional objects or articles with a volumetric additive manufacturing apparatus.

In another embodiment of the present invention, the projected patterns, corresponding to projections in VAM, are pre-distorted by a spatial light modulator such that upon propagation into the scattering medium (i.e. the photoresponsive material loaded with scattered particles), a more accurate representation of the object projection is obtained. An embodiment to implement such a distortion compensation is to measure the transmission matrix of the scattering medium. For example, the transmission matrix can obtained according to the method described in "Measuring the Transmission Matrix in Optics: An Approach to the Study and Control of Light Propagation in Disordered Media", S. M. Popoff, G. Lerosey, R. Carminati, M. Fink, A. C. Boccara, and S. Gigan Phys. Rev. Lett. 104, 100601-2010).

Considering that the 2D image at the output of the scattering medium is represented by a one dimensional vector Y, the linear transformation of the scattering medium is represented by a matrix A and the input image (e.g. on the spatial light modulator) described by a one dimensional vector X. There exists invariant spatial modes upon propagation. An estimate of these invariant modes can be obtained by the eigen-vectors of the matrix via for example performing a well know singular value decomposition. As a linear combination of invariant modes is also an invariant mode, the initial projected patterns obtained with VAM are decomposed into in the invariant modes. The new pre-distorted patterns are then patterns which have been obtained by the proper linear combination of the invariant modes.

The invention claimed is:

1. A method of fabricating a three-dimensional article comprising the steps of:
providing, in a transparent container of an apparatus for tomographic additive manufacturing, a photoresponsive material, wherein said photoresponsive material contains scattering particles;
adjusting a refractive index of said photoresponsive material so as to match the refractive index of said scattering particles;
generating from a light source of said apparatus two-dimensional light-patterns based on computed tomographic projections of said three-dimensional article, and
projecting two-dimensional light-patterns into said photoresponsive material and defining a three-dimensional dose distribution, thereby creating a distribution of alterations in said photoresponsive material, and thereby creating said article.

2. The method according to claim 1, wherein the refractive index of said photoresponsive material is adjusted by adding to said photoresponsive material a medium having a different refractive index that will act as a tunable refractive index medium.

3. The method according to claim 2, wherein said medium having a different refractive index is selected from the group consisting of iodixanol, Ethoxylated (4) Bisphenol A Dimethacrylate (BPA4EODMA), Ethoxylated (10) Bisphenol A Dimethacrylate (BPA10EODMA), Ethoxylated (2) Bisphenol A Dimethacrylate (BPA2EODMA), Ethoxylated (3) Bisphenol A Dimethacrylate (BPA3EODMA), 2-Phenoxyethyl Methacrylate, Tricyclodecanedimethanol Diacrylate, Ethoxylated (10) Bisphenol A Diacrylate (BPA10EODA), Ethoxylated (4) Bisphenol A Diacrylate (BPA4EODA), Ethoxylated (3) Bisphenol A Diacrylate (BPA3EODA), Ethoxylated 4 Phenyl Acrylate (P(4E0)A), 2-Phenoxyethyl Acrylate (2-PEA), and combinations thereof.

4. The method according to claim 1, wherein adjusting the refractive index of said photoresponsive material so as to match the refractive index of said scattering particles is performed such that the refractive indices of said photoresponsive material and of said scattering particles differ from each other by not more than 2%.

5. The method according to claim 2, wherein the match of the refractive index of said photoresponsive material to the refractive index of said scattering particles is achieved by the following steps:
measuring an average refractive index $<n_{part}>$ of the scattering particles;
mixing said photoresponsive material with said medium having a different refractive index in different volume ratios $V_m$, and measuring a refractive index $n_{mixt}$ of each of the mixtures;
interpolating said measurements of $n_{mixt}$ for different volume ratios $V_m$ so as to derive an optimal volume ratio $V_{opt}$ of the photoresponsive material and the medium having a different refractive index to yield a mixture of refractive index $n_{mixt}(V_{opt})=<n_{part}>$;
mixing said photoresponsive material and the medium having a different refractive index in said volume ratio $V_{opt}$ and measuring a refractive index $n_{mixt,2}$ of said mixture;
assessing that the refractive index $n_{mixt,2}$ of said mixture matches with the average refractive index $<n_{part}>$ of the scattering particles.

6. The method according to claim 1, wherein the scattering particles are cells.

7. The method according to claim 1, wherein said two-dimensional light-patterns are projected into said photoresponsive material using a light source emitting light of a wavelength longer than 630 nm.

8. The method according to claim 7, wherein said photoresponsive material additionally contains up-conversion nanoparticles.

9. The method according to claim 8, wherein said up-conversion nanoparticles are selected from the group consisting of a core-shell nanoparticle composed of a core of sodium yttrium fluoride doped with neodymium and a shell composed of sodium yttrium fluoride doped with ytterbium, a core-shell nanoparticle composed of a core of sodium yttrium fluoride doped with neodymium and a shell composed of sodium yttrium fluoride doped with ytterbium, erbium and neodymium, and combinations thereof.

10. A method of fabricating a three-dimensional article comprising the steps of:
provoking, in a transparent container of an apparatus for tomographic additive manufacturing, a photoresponsive material, wherein said photoresponsive material contains scattering particles,
generating from a light source of said apparatus a first set of two-dimensional light-patterns based on computed tomographic projections of said three-dimensional article, and
generating a second set of two-dimensional light-patterns obtained from said first set of two-dimensional light-patterns by applying a computed pre distortion to compensate for a distortion effect caused by light propagation in said photoresponsive material, and
projecting said second set of two-dimensional light-patterns into said photoresponsive material and defining a three-dimensional dose distribution, thereby creating a distribution of alterations in said photoresponsive material, and thereby creating said article, wherein said second set of two-dimensional light-patterns are projected into said photoresponsive material using a light source emitting light of a wavelength, and wherein said computed pre distortion is obtained by decomposing said first set of two-dimensional light-patterns as a linear superposition of invariant optical modes of said photoresponsive material.

* * * * *